MATERIAL TRANSFERRING APPARATUS

Original Filed Jan. 28, 1966 3 Sheets-Sheet 1

INVENTOR
NEAL E. JAMESON

BY Francis W. Anderson
ATTORNEY

MATERIAL TRANSFERRING APPARATUS

Original Filed Jan. 28, 1966 3 Sheets-Sheet 2

INVENTOR
NEAL E. JAMESON

BY Francis W. Anderson
ATTORNEY

MATERIAL TRANSFERRING APPARATUS

Original Filed Jan. 28, 1966 3 Sheets-Sheet 3

INVENTOR
NEAL E. JAMESON

BY Francis W. Anderson
ATTORNEY

United States Patent Office

Re. 27,343
Reissued Apr. 25, 1972

27,343

MATERIAL TRANSFERRING APPARATUS

Neal E. Jameson, Orange, Calif., assignor to FMC Corporation, San Jose, Calif.

Original No. 3,442,307, dated May 6, 1969, Ser. No. 523,788, Jan. 28, 1966. Application for reissue Nov. 16, 1970, Ser. No. 90,166
Int. Cl. B65b *3/04*
U.S. Cl. 141—387 10 Claims

Matter enclosed in heavy brackets [ ] appears in the original patent but forms no part of this reissue specification; matter printed in italics indicates the additions made by reissue.

ABSTRACT OF THE DISCLOSURE

A fluid material transferring apparatus of the marine loading arm type, including an upright riser conduit, an inner arm conduit mounted on the riser conduit for pivotal movement about a generally horizontal axis, a winch and cable mechanism powered by an hydraulic system for pivoting the arm conduit about this axis, and a brake mechanism associated with the winch and hydraulic system in such a manner that in the absence of a predetermined hydraulic pressure the brake will automatically set and prevent the winch from rotating, and in the presence of that hydraulic pressure the brake will automatically release the winch. Also provided are a manual lockout assembly for holding the brake in released position when the hydraulic system is underpressured, and a slip coupling to permit the winch to rotate, though the brake is set, when excessive strain is exerted on the cable.

*CROSS REFERENCES TO RELATED APPLICATIONS*

The fluid transferring apparatus of the present invention is an improvement of the apparatus disclosed in my copending application, Ser. No. 520,943 filed on Jan. 17, 1966, entitled Fluid Transferring Apparatus, now U.S. Pat. No. 3,409,047. Consequently, the detailed description of the loading arm may be had by referring to the above-mentioned application, the description of which is incorporated herein by reference thereto.

*BACKGROUND OF THE INVENTION*

The present invention pertains to fluid material transferring apparatus and, more particularly, to a mechanism for positioning such an apparatus in a vertical plane and for placing said apparatus after being positioned in a free-wheeling condition.

Generally, the present invention is especially adapted for use with fluid transferring apparatus which is mounted on board a ship. However, the principles of the invention are equally applicable to a transferring apparatus mounted on a dock and used to transfer fluid material to or from a ship.

Whether the fluid transferring apparatus is mounted on board the ship or is mounted on a dock, in both instances the apparatus serves to convey fluid material between two tanks, one of which will be movable relative to the other. In such a situation, it is necessary that the apparatus be positively positioned or moved so as to be connected to the two tanks. Also, it is necessary that the apparatus be free to move without restraint after the apparatus is connected between the two tanks so that movement of one tank with respect to the other will permit the apparatus to follow the moving tank and maintain its connection therewith without damaging the rest of the apparatus.

*SUMMARY*

In principle, the invention permits the fluid material transferring apparatus to be positively positioned by hydraulic power and then connected between two relatively movable tanks. After being connected the apparatus is placed on a free-wheeling condition to move with the movable tank without being damaged. In addition, the invention embodies apparatus which will positively hold the apparatus while being positioned by the hydraulic power should a power failure occur while the apparatus is being moved and apparatus for deactivating the hydraulic power when in the free-wheeling condition.

Accordingly, it is an object of the present invention to provide an improved fluid material transferring apparatus.

Another object is to provide a fluid transferring apparatus which is movable by hydraulic power and which is free to move without restraint when disconnected from said hydraulic power.

Another object is to provide a brake mechanism which will hold a portion of the apparatus should the hydraulic power become inoperative and which can be positively locked out of braking engagement to maintain the apparatus free to move without restraint.

It is another object of the present invention to provide a positioning and holding mechanism for the fluid transferring apparatus which is simple and safe to operate and which is maintained in an inoperative condition when the fluid transferring apparatus is in a free-wheeling condition.

Other objects and advantages of the invention will become more apparent upon reference to the following description and accompanying drawings [, in which:].

*DESCRIPTION OF THE PREFERRED EMBODIMENT*

Figure 1:
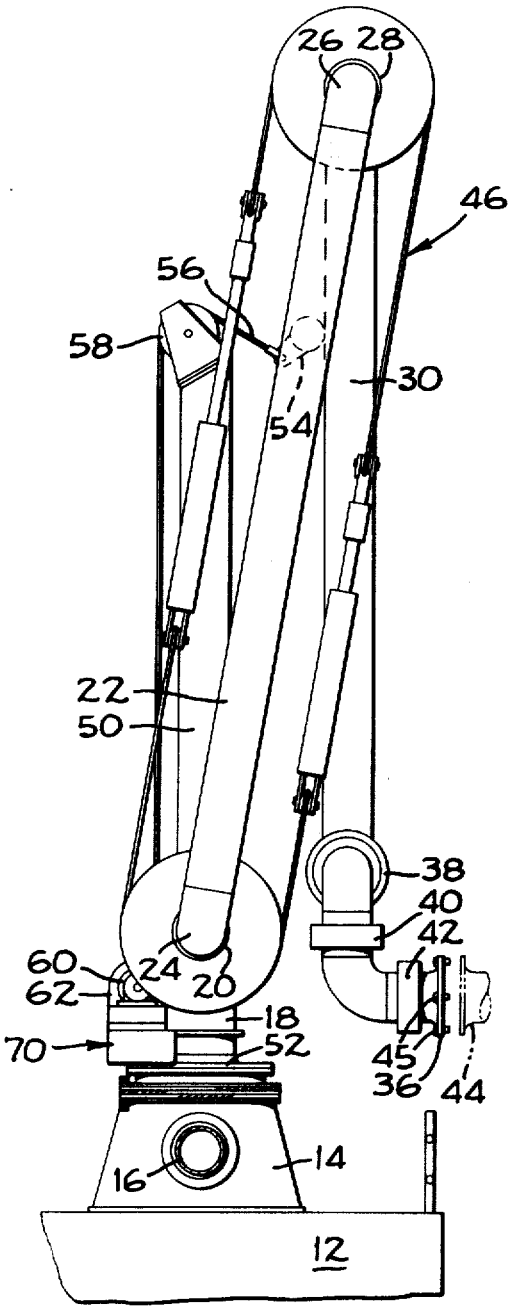
FIG. 1 is a side elevation of fluid material transferring apparatus mounted on board a ship and embodying the principles of the present invention.
Figure 2:
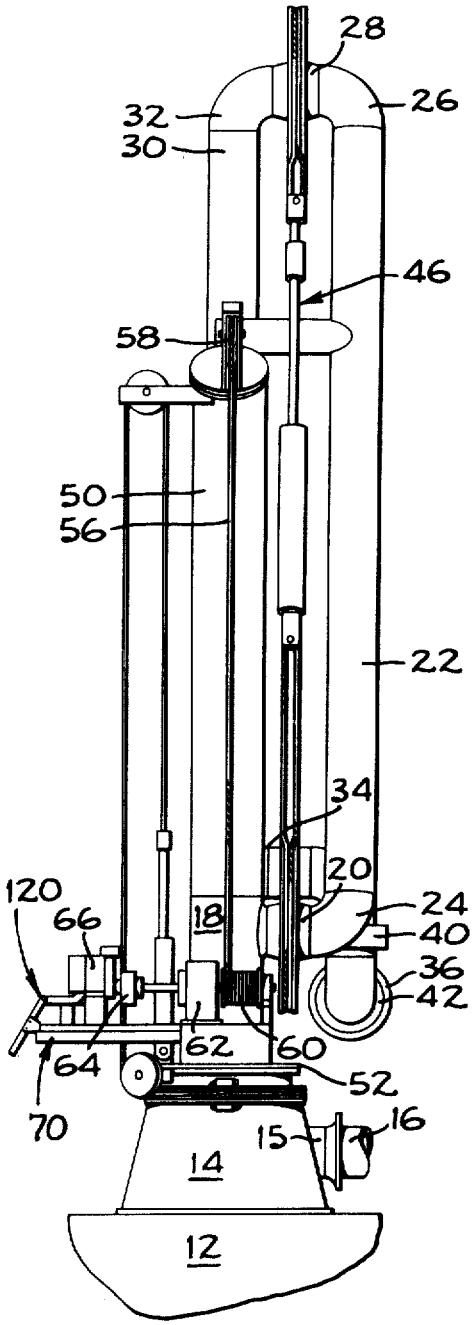
FIG. 2 is a rear elevation of the apparatus shown in FIG. 1.

Generally, with reference to FIGS. 1 and 2, a deck of a ship is indicated by the numeral 12. The fluid transferring apparatus embodying the present invention includes a hollow frusto-conical base 14 secured to the deck. An elbow conduit 15 is mounted in the base with one end extending upwardly. A transfer conduit 16 is connected to the other end of the elbow conduit and is connected at one end, not show, with a tank on board the ship. The upwardly extending end of the elbow conduit is connected to an upright conduit 18 which is mounted on the base for rotation about a vertical axis, this being the longitudinal axis of the upright conduit.

Although well known in the art, the subject fluid transferring apparatus also includes an inner swivel joint 20 connected to one side of the upright conduit 18, an inner conduit or arm 22 having an inner elbow 24 connected to the inner swivel joint and an outer elbow 26 connected to an outer swivel joint 28. An outer conduit 30 having an inner elbow 32 is connected to the swivel joint 28. The outer conduit also has an outer elbow 34 connected to an outboard coupling 36 by swivel joints 38, 40 and 42. Thus, fluid communication is effected between the outboard coupling and the fluid material storage tank aboard ship and when the coupling is connected to the flange of a second storage tank, on the shore or on the dock, as shown in phantom lines in FIG. 1 and indicated by the reference numeral 44, fluid communication is effected between the two tanks. The means for connecting the coupling unit to the stationary pipe on the on shore tank may be any conventional flange coupling device, such as bolts 45 and for example, as shown in Bily Patent No. 2,980,150. Since the inner conduit is connected by a Swivel joint to the upright conduit it is thus free to pivot about the upright conduit in a substantially vertical plane. The outer conduit is pivoted with respect to the inner conduit by hydraulically actuated linkages indicated generally by the reference numeral 46. Mechanism for moving the outer conduit is described in detail in the copending application of P. J. Bily, Ser. No. 171,841, filed Feb. 8, 1962, *now U.S. Patent No. 3,382,893*, and assigned to the assignee of the subject application. Likewise, as is described in more detail in my aforementioned copending application, the inner conduit and the outer conduit are both able to rotate as a unit on the base 14.

In order to raise and lower the inner conduit 22, a mast 50 is secured to a mounting plate 52 which is rotatably mounted on the base 14. A bracket 54 (FIG. 1) is fixed to the inner conduit and has attached thereto a flexible cable 56 which passes over a sheave 58 freely rotatably mounted at the upper end of the mast. The inner end of the cable is wound about a winch 60 (FIG. 2) which is powered through a conventional gear reduction unit 62 and a conventional slip coupling 64 by a reversible hydralic motor 66. Operation of the hydraulic motor raises and lowers the inner conduit about the axis of the inner swivel joint 20. An overload on the hydraulic motor, as were the inner conduit is caught on an obstruction, will result in slipping of the coupling 64 thus preventing damage to the rest of the apparatus.

As is best shown in FIG. 2, the winch 60 gear reduction unit 62, slip coupling 64 and hydraulic motor 66 are mounted on a support frame 70 which is fixed to the mounting plate 52. More specifically there is fixed to the support frame 70 an upright support plate 72. On the outer side of the support plate, to the left as viewed in FIG. 3, the hydraulic motor is fastened by any conventional means. Journalled in the support plate by a bearing not shown is a shaft 74 which is driven by the hydraulic motor. The shaft 74 is connected to the slip coupling 64 which, in turn, is connected to a second shaft 76. The second shaft is connected with the gear reduction unit to complete the drive to the winch 60.

Figure 3:
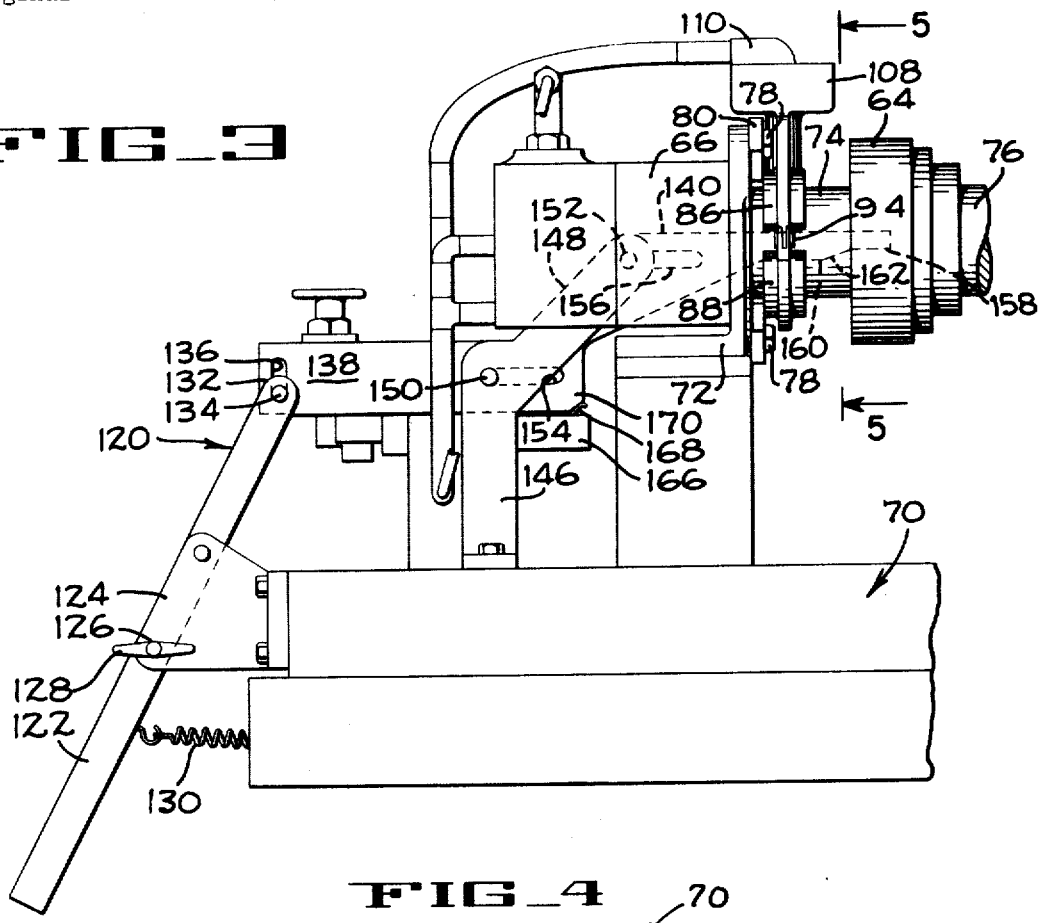
FIG. 3 is an enlarged elevation of a portion of the apparatus shown in FIG. 2.
Figure 4:
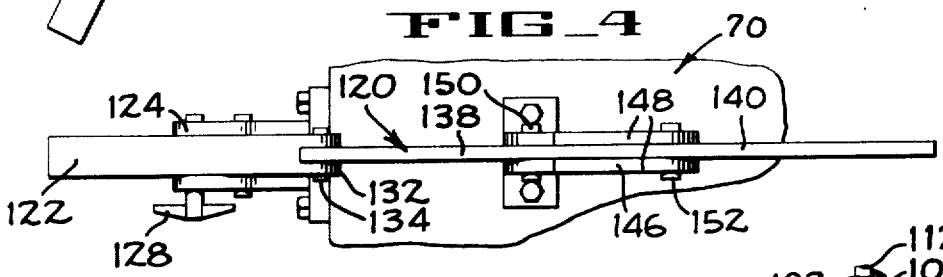
FIG. 4 is an enlarged fragmentary plan of a portion of the apparatus shown in FIG. 3.
Figure 5:
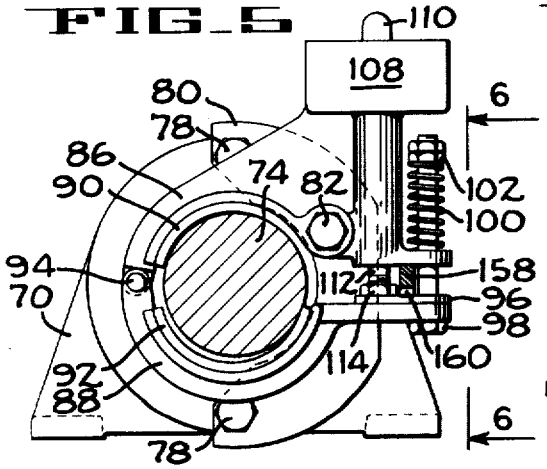
FIG. 5 is an enlarged fragmentary section taken along the lines 5—5 in FIG. 3.

As is best shown in FIGS. 3 and 5, fastened to the inner end of the support plate as by bolts 78 is a semi-circular bracket 80. Mounted on the semi-circular bracket by a bolt 82 is a brake element 84. The brake element 84 includes an upper brake arm 86 and a lower brake arm 88. Each of the brake arms is provided with a brake lining 90 and 92, respectively. The brake arms are joined by a pin 94 which passes through apertures in the arms such that the lower arm can pivot with respect to the upper arm. A wear plate 96 is fastened to the lower brake arm radially outward from the shaft 74. Passing through aligned apertures in the lower brake arm, wear plate and upper brake arm is elongated bolt 98. A compression spring 100 circumscribes the upper end of the bolt and is retained on the bolt by a set of lock nuts 102. The spring is held in compression by the lock nuts such that in its normal disposition the spring pulls the brake arms toward one another so that the linings press tightly against the shaft 74, thus, stopping the shaft.

To release the linings 90 and 92 from the shaft 74 an hydraulic actuator 108 (FIG. 5) is integrally formed on the upper brake arm 86. The actuator is connected by a coupling 110 to a source of hydraulic fluid. At the lower end of the actuator is an actuating rod 112 which abuts against an adjustable stop 114 secured to the wear plate 96. When pressurized hydraulic fluid is admitted to the hydraulic actuator, the actuator rod is projected outwardly. As the actuator arm moves it pushes against the adjustable stop to separate the upper and lower brake arms against the force of the spring 100. When the pressure on the fluid is relieved, the spring returns the brake arms to their shaft engaging position.

Referring to FIGS. 3–6, there is shown a lockout mechanism 120. As will be apparent from the following, when the lockout mechanism is actuated, the brake arms 86 and 88 will be precluded from closing under the influence of the spring 100. The lockout mechanism includes a handle 122 pivotally mounted on a bracket 124 which is fixed to the support frame 70. The bracket is apertured as at 126 to receive a pin 128 which, when the handle is in its uppermost position, passes through an aligned aperture in the handle to restrain the handle against moving. A spring 130 normally biases the lower part of the handle toward the support frame 70. The upper end of the handle is slotted and forms a yoke 132 which is apertured to receive a pivot pin 134. The pivot pin 134 passes through a slot 136 in a lockout arm 138. As best shown in dotted lines in FIG. 3, the lockout arm is provided with an upwardly and inwardly disposed extension member 140.

To support the lockout arm 138 there is provided a slide bracket 146 (FIG. 3) which includes two upwardly and inwardly disposed spaced guides 148. Each of the guides are apertured to receive lower and upper guide pins 150 and 152, respectively. The guide pins rest in two parallel elongated slots 154 and 156, respectively, which are formed in the arm. By removing the pin 128 the lockout arm may be retracted in a straight line with the upper and lower pins sliding in the elongated slots 154 and 156.

Figure 6:
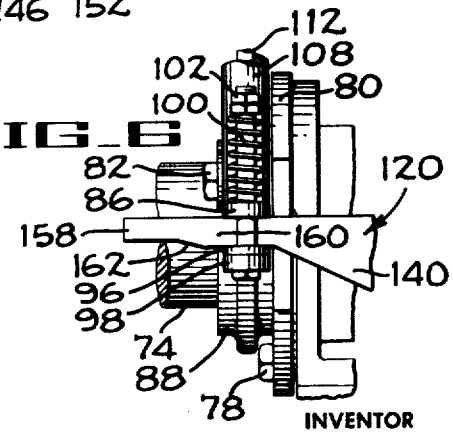
FIG. 6 is a fragmentary elevation looking generally in the direction of arrows 6—6 in FIG. 5.

As is best shown in FIGS. 3 and 6, the innermost end of the extension member 140 is provided with a narrow neck portion 158 a wide bearing portion 160 which are joined by a sloping portion 162. The vertical dimension of the wide bearing portion is greater than the distance between the upper brake arm 86 and the wear plate 96 when the linings 90 and 92 are in engagement with the motor shaft 74. With the lockout arm in the position shown in FIGS. 3–6, in other words, with the lockout arm moved to the right as viewed in FIG. 3, the wide bearing portion engages the upper brake arm and the wear plate and precludes the brake arms and linings from coming together under the action of the spring 100 to engage the shaft 74. When the pin 128 is removed and the lockout arm is retracted to the left, as viewed in FIG. 3, the wide bearing portion 160 will no longer be abutting against the wear plate and the upper brake arm and only the narrow neck portion 158 will be projecting between the brake arms. The distance between the upper brake arm and the wear plate, when the brake linings are fully engaged to stop the shaft 74, is greater than the vertical dimension of the narrow neck portion. Consequently, when the lockout arm is in its retracted position, no part of the extension member inhibits the closing action of the brake element.

An important aspect of the invention is the combined electrical and hydraulic control systems which enable the inner conduit 22 of the transfer apparatus to be either positively positioned or placed in a free-wheeling condition. To tie together the electrical system, the hydraulic system and the lockout arm there is provided a spring biased limit switch 166 (FIG. 3) fastened to the slide bracket 146. The limit switch has a contact actuating arm 168 which is biased to the left, as viewed in FIG. 3. As will be hereinafter described in more detail when the lockout arm 138 is moved inwardly, to the right in FIG. 3, the contact actuating arm is engaged by a lower corner 170 of the lockout arm. Continued movement to the right of the lockout arm into its innermost position moves the contact actuating arm from the left to the right thus moving the contacts within the switch from one position to another. When the lockout arm is retracted, the corner 170 moves to the left away from the contact actuating arm allowing the spring bias of the switch to return the switch contacts to their original position.

Figure 8:
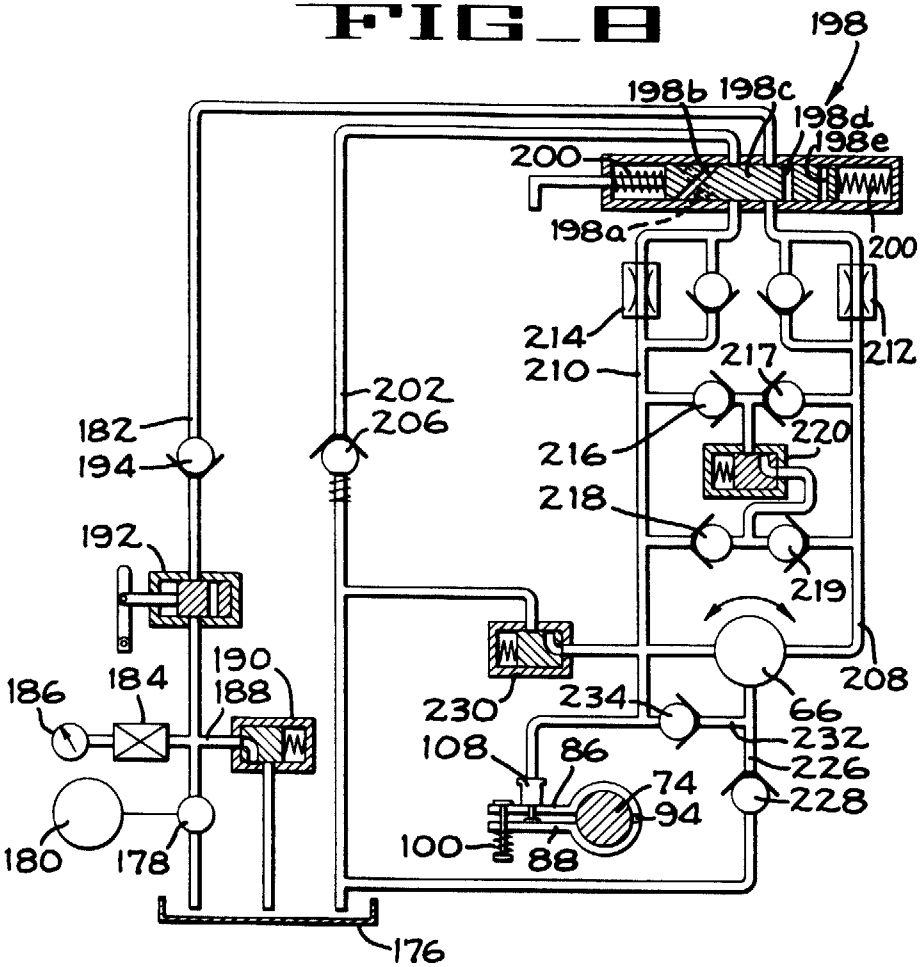
FIG. 8 is a diagrammatic hydraulic circuit for the instant invention.

FIG. 8 shows diagrammatically the preferred hydraulic control system. Identical systems can be employed to operate more than one fluid transferring apparatus when, for example, two or more are used as described in my aforementioned copending application. For the purpose of brevity, however, the hydraulic circuit diagram is shown for use only with a single fluid transferring apparatus, it being understood that one skilled in the art could modify the system for multiple installation. Reference numeral 176 indicates a reservoir for a supply of hydraulic fluid. A pump 178 communicates with the reservoir and is driven by an electric motor 180. The pump and motor form part of an hydraulic power unit which supplied pressurized fluid to the hydraulic control system. Connected to the pump is a pressure line 182. Connected to the pressure line is a conventional pulsation dampener 184 and a pressure gauge 186. Also connected to the pressure line is a bypass line 188 which communicates with a relief valve 190 to divert pressurized fluid back into the reservoir when a stoppage occurs in the pressure line with the pump operating. A main valve 192 is provided in the pressure line to control the flow of fluid therethrough. Downstream of the main valve is a conventional check valve 194. The pressure line communicates with a slidable control valve 198 which is provided with crossover ports 198a and 198b, a blind portion 198c and straight ports 198d and 198e. Springs 200 normally bias the control valve in its centermost position, as shown in FIG. 8, with the blind portion confronting the pressure line 182.

A return line 202 also communicates with the reservoir 176 and a spring loaded check valve 206 which opens to the reservoir only after a pre-set pressure is attained in the return line. When the control valve 198 is in its centermost position, the blind portion 198c is also confronting the return line 202.

On the other side of the control valve 198 are connected a pair of pressure lines which, for the purpose of description will be designated as a right-hand line 208 and a left-hand line 210. The right-hand and left-hand lines are provided with speed control valves 212 and 214, respectively. Interconnecting the right-hand and left-hand lines are four check valves 216, 217, 218 and 219 and a pressure operated diverter valve 220. The right-hand line also communicates with a right-hand port on the reversible hydraulic motor 66. Likewise, the left-hand line communicates with a left-hand port on the hydraulic motor. The designations of right-hand port and left-hand port are used solely for the purpose of description and any of the two main ports of a conventional reversible hydraulic motor can be used. A drain line 226 communicates with a drain port on the hydraulic motor and with the reservoir 176. A 10 p.s.i. check valve 228 is provided in the drain line 226 to prevent a reversal of flow in that line.

Also communicating with the left-hand line 210 is a relief valve 230 which is spring biased closed and which opens to the reservoir 176 when a predetermined pressure is exceeded in the left-hand line. This pressure in the left-hand line will be greater than the pressure necessary to actuate the hydraulic actuator 108 which also communicates with the left-hand line. A bypass line 232 connects the left-hand line with the drain line 226 and has included therein a 5 p.s.i. check valve 234.

Figure 7:
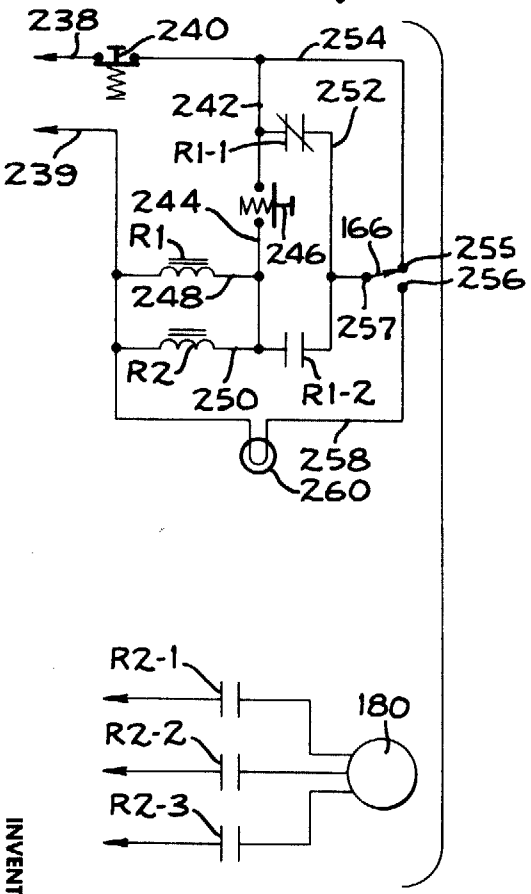
FIG. 7 is a diagrammatic electrical circuit for the instant invention.

The electrical circuit is best described by referring to FIG. 7 wherein main lines 238 and 239 are connected to a 110 volt-60 cycle electric supply. Connected in the line 238 is a push button stop switch 240 which is spring biased into a normally closed position. The stop switch connects line 238 with line 242 which in turn is connected to line 244 through a push button starter switch 246. The starter switch 246 is normally spring biased into an open position. Line 244 is connected respectively to relays R1 and R2 through lines 248 and 250. The lines 248 and 250 are in turn connected to main line 239. Line 242 is also connected to a line 252 through a first set of normally closed relay contacts R1–1. Line 252 is connected to line 244 by a second set of normally open relay contacts R1–2.

Line 242 is also connected through a line 254 to one set of contacts 255 of the limit switch 166. With the limit switch in the position as shown in FIG. 7, line 254 is connected to line 252 through another set of contacts 257.

With contacts 255 and 257 closed, the contact actuating arm 168 is in a position furthest to the left as *viewed in FIG. 3, in other words, the position resulting from retracting the lock out arm 138 to the left. The foregoing constitutes a holding circuit the purpose of which will be described in more detail below.*

*The remaining set of contacts 256 of the limit switch 166 connect line 252 with an indicator line 258. Connected in the line 258 is an indicator light 260.*

*At the bottom of FIG. 7 is shown a circuit for operating the electric pump motor 180. The circuit comprises three lines connected to a 440 volt, three phase, 60 cycle electric supply. The three lines are connected to the motor by three normally open sets of relay contacts R2–1, R2–2 and R2–3 associated with the relay R2. When the contacts are closed the motor is energized to drive the pump 178 supplying pressurized fluid to the hydraulic system.*

*The circuit shown in FIG. 7 acts as a control circuit and incorporates therein a safety circuit which prevents supplying the hydraulic system with pressurized fluid when the lockout arm 138 is moved to the right and its wide bearing portion is inserted between the upper and lower brake arms 86 and 88. When the lockout arm is in its innermost position, preventing the spring 100 from closing the brake to stop the shaft 74, the contact actuating arm 168 of the limit swith 166 will be moved to the right thus closing the circuit through contacts 256 and 157.*

*In the position shown in FIG. 7, in other words, with the lockout arm 138 retracted, depression of the starter switch 246 will instantaneously close a circuit consisting of lines 238, stop switch 240, line 242, starter switch 246.* line 244, line 248, relay R1, line 250, relay R2, and line 239. As relay R1 is energized, the normally closed contacts R1–1 are opened and the normally open contacts R1–2 are closed. Since the starter switch 246 is only depressed instantaneously and then released the circuit through lines 242 and 244 is broken. If the limit switch contacts are in the position shown in FIG. 7, in other words with the lockout arm retracted, the holding circuit through lines 128, stop switch 240, line 254, contacts 255, contacts 257, contacts R1–2 (now closed), line 244, line 248, relay R1, line 250, relay R2, and line 239 will be a complete circuit. Thus, with the lockout arm in its retracted position, a closed holding circuit through the relays R1 and R2 will be maintained after the starter switch 246 is released. With the circuit through relay R2 maintained, the normally open contacts R2–1, R2–2, and R2–3 will be closed energizing the electric motor 180 and thus producing a supply of pressurized hydraulic fluid to operate the hydraulic system. When it is desired to stop the electric motor the stop switch 240 is opened thus breaking the circuit through relays R1 and R2. With relay R2 de-energized the contacts R2–1, R2–2 and R2–3 return to their normally open positions.

When the lockout arm 138 is in its innermost position, the corner 170 moves the contact actuating arm 168 so that the contacts 255 are opened and the contacts 256 and 257 are closed. In this position a circuit is closed through line 238, stop switch 240, line 242, normally closed relay contacts R1–1, line 252, contacts 257, contacts 256, line 258, indicator light 260 and line 239. Thus when the lockout arm is in its innermost position, the indicator light 260 which is mounted on the control panel is lit to warn the operator that the motor should not be energized. As an additional safety feature, if the starter switch 246 is accidentally pushed to close a circuit through line 238, stop switch 240, line 242, starter switch 246, line 244, line 248, relay R1, line 250, relay R2, and line 239, the motor 180 will not be energized for the following reason. When the starter switch 246 is released, there will be no holding circuit to keep the relays R1 and R2 energized. Although closed contacts R1–1 will be opened instantaneously and normally open contacts R1–2 will be closed; the holding circuit through line 254, contacts 255 and contacts 257 will be open and the relays R1 and R2 will immediately return to their inactive conditions returning the contacts R1–1 and R1–2 to their respective, normally closed and normally open positions. Thus, as can be readily seen, it is impossible to maintain a closed circuit through the relay R2 to energize the motor 180 when the lockout arm 138 is in its innermost position. Since it is undesirable to operate the hydraulic motor when the brake arms 86 and 88 are locked open, this combined indicator light and safety circuit is an effective safety feature of the instant invention.

The overall operation of the apparatus is best described by referring to the hydraulic circuit diagram shown in FIG. 8. Assuming the lockout arm 138 is in its retracted position with the limit switch contact shown as in FIG. 7, it is first necessary to close the starter button 246 in order to move the inner conduit 22. As aforementioned, this will energize the relays R1 and R2 and when the starter button is opened, the holding circuit through line 238, stop switch 240, line 254, contacts 255, contacts 257, relay contacts R1–2 and line 244 will maintain the relays R1 and R3 energized to operate the electric motor 180. With the electric motor operating, the hydraulic fluid will be pressurized through the pump 178 and passed into the pressure line 182. By opening the main valve 192, the pressurized fluid will pass through the check valve 194 to the control valve 198. The valve 192 is a main control valve which can be replaced by a multiport control valve to supply pressurized fluid to more than one fluid transferring apparatus if desired.

To raise the inner conduit 22, as where the loading or unloading operation is completed and the outboard coupling 36 has been disconnected from the flange on the pipe 44 of the storage tank on shore, the control valve 198 is moved to the left as viewed in FIG. 8 aligning the port 198e with the pressure line 182 and the port 198d with the return line 202. Pressurized fluid will then pass through the speed control valve 212 to the hydraulic motor 66. With the lockout arm 138 in its retracted position, the motor shaft 74 will be engaged by the linings on the brake arms 86 and 88 since at this time the cylinder 108 will not be energized and the brake arms will be closed by the spring 100. With the brake engaged the hydraulic motor cannot turn and pressure will build up in the right-hand line 208 until the force of the spring in the diverter valve 220 is overcome letting the fluid pass through check valve 219, diverter valve 220 and check valve 216 into the left-hand line 210. The spring loaded check valve 206 will permit pressure to build up in the return line 202 and the left-hand line 210 until it is sufficient to energize the hydraulic actuator 108 and release the brake. With the motor shaft disengaged from the brake, the hydraulic motor is free to rotate and operates the winch through the gear reduction unit 62 to raise the inner conduit. The fluid passing through the pump is returned to the reservoir by passing through the left-hand line 210, the speed control valve 214, port 198d, return line 202 and spring loaded check valve 206. The speed control valve 214 and the spring loaded check valve 206 maintain sufficient restriction in the left-hand and return lines to prevent the hydraulic actuator from allowing the brake to close on the motor shaft 74. Of course, should the hydraulic pressure be lost as, for example, through a power failure, the pressure in the lines 210 and 208 will immediately drop off allowing the spring to again force the brake arms against the motor shaft thus halting movement of the inner conduit.

To lower the inner conduit 22 the electric motor 180 is energized and the main valve 192 opened to again pressurize the pressure line 182. The control valve 198 is moved to the right such that port 198a communicates with the return line 202 and the right-hand line 208 whereas the port 198b communicates with the pressurized line 182 and the left-hand line 210. As pressure builds up in the left-hand line, the hydraulic actuator 108 opens the brake permitting the hydraulic motor 66 to turn under the weight of the inner conduit 22. The fluid then passes through the hydraulic motor into the right-hand line 208. Since the weight of the inner conduit is extremely great the hydraulic motor is turned by the winch 60 causing the fluid in the right-hand line to become pressurized. Should the fluid in the right-hand line begin to flow too rapidly, the hydraulic motor will tend to evacuate the left-hand line. In other words, the fluid in the right-hand line 208 will be returning to the reservoir at a faster rate than the fluid entering through the speed control valve 214 in the left-hand line. Should this occur the hydraulic actuator 108 will be de-pressurized closing the brake on the shaft 74. Likewise, should a power failure occur and the pressure in the left and right-hand lines 210 and 208 drop, the brake will stop the shaft 74 precluding further movement of the inner conduit until the pressure deficiency is corrected.

Once the inner conduit is lowered and the outboard coupling 36 connected to the pipe 44 on the on shore storage tank the inner conduit is placed in a free-wheeling condition. This will enable the conduit to lower or raise due to fluctuations in the height of the ship with respect to the shore. Such fluctuations often occur from tides or other external conditions. Once the outboard coupling is connected with the pipe 44 the wide bearing portion [168] *160* of the lockout arm 138 is inserted between the upper and lower brake arms 86 and 88. In this manner the wide bearing potrion will keep the brake linings disengaged from the shaft 74. At the same time, the holding circuit in the electrical control circuit is opened and limit switch contacts 256 and 257 are closed lighting the indicator light 260. As was earlier mentioned when the lockout arm is in its innermost position, the electric motor is not operating thus preventing the operator from inadvertently trying to raise or lower the inner conduit when it is attached to the pipe 44. Should the lockout arm 138 be accidently removed and an attempt made to raise the inner conduit, the slip coupling 64 will prevent damage to the remainder of the fluid material transferring apparatus.

Movement of the outboard conduit 30 or slewing of the total transfer unit is accomplished by hydraulic controls, not shown, connected to the pressure line 182 and the return line 202. Details of such mechanisms are clearly described in my aforementioned co-pending application and in Bily application, Ser. No. 171,841 filed Feb. 8, 1962, *now Patent No. 3,382,893*.

Several advantages should be apparent from the foregoing description. The lockout arm permits free-wheeling of the inner conduit when flanged to the on shore pipe. The automatic closing of the brake, if electrical or hydraulic power failure occurs, provides an inherent safety feature. Likewise, the winch cannot be operated by the hydraulic motor when the brake is locked open. Still another advantage is the inexpensive and compact design which keeps at a minimum the space requirements necessary when the fluid transferring apparatus is used on board ship.

Although a preferred embodiment of the present invention has been shown and described, it will be understood that various changes and modifications may be made in the details thereof without departing from the spirit and the scope of the appended claims.

Having described the invention, what is desired to be secured by Letters Patent is as follows:

1. Fluid material transferring apparatus comprising a base, a first conduit mounted on said base, means for connecting said first conduit to a first storage tank, a second conduit pivotally connected to said first conduit for movement in a substantially vertical plane, means for connecting said second conduit to a second storage tank, rotating means for moving said second conduit in said plane so as to place said second conduit connecting means in position for connecting to said second storage tank, means including a releasable brake for preventing rotation of said rotating means and for holding said second conduit against movement in said plane, and means for locking said brake in a released position whereby said rotating means is free to rotate and said second conduit is free to pivot when connected to said second storage tank.

2. Apparatus defined by claim 1 wherein said means for moving said second conduit includes an hydraulic power unit, and further including means for deactivating said hydraulic power unit when said brake is locked in a release position.

3. Apparatus defined by claim 2 wherein said releasable brake includes a brake arm normally biased in a braking position and hydraulic actuator means for releasing said brake, and said means for locking said brake in said released position includes a lock-out arm which engages said brake arm to preclude said brake from returning to its braking position.

4. Apparatus defined by claim 3 wherein said lock-out arm is reciprocally mounted on said base for movement in a straight line.

5. Apparatus for positioning a freely pivotal arm of a material transferring device comprising rotating means for raising and lowering said arm in a vertical plane, means including a releasable brake for preventing rotation of said rotating means and for holding said arm against movement in said plane, and means for locking said brake in a released position whereby said arm is free to move.

6. Apparatus defined by claim 5 wherein said means for raising and lowering said arm includes an hydraulic motor having a rotatable shaft and wherein said brake is normally spring biased in engagement with said shaft and includes an hydraulically actuated brake release mechanism.

7. Apparatus defined by claim 6 wherein said means for raising and lowering said arm further includes an hydraulic power unit, means for connecting said hydraulic power unit, said hydraulic motor and said brake release mechanism whereby pressurized hydraulic fluid operates said brake release mechanism and drives said hydraulic motor to position said arm.

8. Apparatus defined by claim 7 wherein said brake includes a set of opposed brake arms, and includes spring means normally biasing said brake arms toward one another into engagement with said shaft, and wherein said brake release mechanism includes an actuating rod and an hydraulic actuator which forces said rod against one of said brake arms to move said brake arm and release said shaft.

9. Apparatus defined by claim 8 wherein said means for locking said brake in a released position includes a lock-out arm slidably mounted for insertion between said brake arms when said brake arms are moved by said hydraulic actuator to release said shaft, said lock-out arm having a dimension perpendicular to the opposed faces of said brake arms which is greater than the distance between said brake arms when said brake is engaged whereby said lock-out arm precludes said brake arms from engaging said shaft.

10. Apparatus defined by claim 5 wherein said means for raising and lowering said arm includes an hydraulic power unit, and further including means for deactivating said hydraulic power unit when said brake is locked in a released position.

References Cited

The following references, cited by the Examiner, are of record in the patented file of this patent or the original patent.

UNITED STATES PATENTS 3,176,730 4/1965 Knight ---------- 141—387

HOUSTON S. BELL, Jr., Primary Examiner

U.S. Cl. X.R.

137—615

PO-1050
(5/69)

UNITED STATES PATENT OFFICE
CERTIFICATE OF CORRECTION

Patent No. RE. 27,343 Dated April 25, 1972

Inventor(s) NEAL E. JAMESON

It is certified that error appears in the above identified patent and that said Letters Patent are hereby corrected as shown below:

Column 3, line 40 - change "were" to -- where --.
Column 6, line 46 - change "157" to -- 257 --.
Column 6, line 59 - change "128" to -- 238 --.

Signed and sealed this 23rd day of January 1973.

(SEAL)
Attest:

EDWARD M.FLETCHER,JR.
Attesting Officer

ROBERT GOTTSCHALK
Commissioner of Patents